(12) United States Patent
Ubben et al.

(10) Patent No.: US 9,458,831 B2
(45) Date of Patent: Oct. 4, 2016

(54) DETERMINING REACTIVE POWER CAPABILITY OF A RENEWABLE ENERGY SYSTEM

(71) Applicant: General Electric Company, Schenectady, NY (US)

(72) Inventors: Enno Ubben, Steinfurt (DE); Werner Gerhard Barton, Gescher (DE); Carsten Junge, Rheine (DE); Arnim Smolenski, Lingen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/624,906

(22) Filed: Feb. 18, 2015

(65) Prior Publication Data
US 2016/0237990 A1   Aug. 18, 2016

(51) Int. Cl.
| F03D 7/00 | (2006.01) |
| F03D 9/00 | (2016.01) |
| H02P 9/30 | (2006.01) |
| H02J 3/18 | (2006.01) |
| F03D 7/04 | (2006.01) |

(52) U.S. Cl.
CPC .............. *F03D 9/005* (2013.01); *H02J 3/1885* (2013.01); *H02P 9/305* (2013.01); *F03D 7/00* (2013.01); *F03D 7/042* (2013.01); *F03D 7/047* (2013.01)

(58) Field of Classification Search
CPC .......... H02J 3/18; H02J 3/286; H02J 3/1885; F03D 7/00; F03D 7/048; F03D 9/005; H02P 9/305
USPC ....... 290/44, 55; 700/286, 287; 307/155, 69, 307/43
See application file for complete search history.

(56) References Cited

U.S. PATENT DOCUMENTS

| 7,430,545 B2* | 9/2008 | Kanbara ................ G06Q 30/00 700/291 |
| 7,818,159 B2 | 10/2010 | Kim et al. |
| 8,860,237 B2 | 10/2014 | Ubben et al. |
| 2008/0150283 A1* | 6/2008 | Rivas .................... H02J 3/1885 290/44 |
| 2008/0313021 A1* | 12/2008 | Nagafuchi ............. G06Q 20/10 705/40 |
| 2010/0025994 A1* | 2/2010 | Cardinal ............... F03D 7/0284 290/44 |
| 2012/0101643 A1 | 4/2012 | Kirchner et al. |
| 2012/0136494 A1 | 5/2012 | Kirchner et al. |
| 2013/0079937 A1* | 3/2013 | Aisu ................... H02J 13/0086 700/286 |
| 2014/0062085 A1 | 3/2014 | Larsen et al. |
| 2014/0094985 A1* | 4/2014 | Hibiya ................. H01M 10/44 700/297 |
| 2015/0249415 A1 | 9/2015 | Babazadeh et al. |
| 2015/0275862 A1* | 10/2015 | Babazadeh ............... H02J 3/18 290/44 |
| 2015/0295529 A1* | 10/2015 | Rose, Jr. ................. H02P 9/305 290/44 |
| 2015/0311715 A1* | 10/2015 | Liberman ................. H02J 3/14 307/29 |
| 2015/0357819 A1 | 12/2015 | Amo |

* cited by examiner

*Primary Examiner* — Julio C. Gonzalez Ramirez
(74) *Attorney, Agent, or Firm* — Dority & Manning, P.A.

(57) ABSTRACT

Systems and methods for controlling a renewable energy system based on actual reactive power capability of the renewable energy system are provided. The reactive power output of the renewable energy system can be controlled based at least in part on an initial reactive power limit. The initial reactive power limit can be determined based on rated reactive power for the power generation units in the renewable energy system. When a difference between a reactive power demand and the actual reactive power production of the renewable energy system fall outside a threshold, the initial reactive power limit can be adjusted to a corrected reactive power limit that is closer to the actual reactive power capability of the renewable energy system.

19 Claims, 7 Drawing Sheets

DETERMINING REACTIVE POWER CAPABILITY OF A RENEWABLE ENERGY SYSTEM

FIELD OF THE INVENTION

The present subject matter relates generally to renewable energy sources, and more particularly, to systems and methods for determining reactive power capability of renewable energy systems, such as wind farms, solar farms.

BACKGROUND OF THE INVENTION

Renewable energy systems, such as wind turbine systems, solar power systems, energy storage systems, etc., have increasingly been used for power generation throughout the world. Renewable energy systems can include a plant or farm having a plurality of power generation units (e.g. wind turbines) that are collectively coupled to a utility grid at a point of interconnect. The renewable energy system can include a control system having a farm level controller(s) and unit level controller(s) to regulate the real and reactive power output of the renewable energy system.

A renewable energy farm may be required to fulfill a reactive power capability at the point of interconnect to provide a desired power factor (e.g. based on a power factor setting). In some cases, renewable energy systems may be required to have the capability to provide a rated reactive power capability in a voltage range of ±10% of nominal voltage at the point of interconnect. To fulfill this requirement, an on-load tap changing transformer can be required. Including an on-load tap changing transformer at each power generation unit (e.g. each wind turbine) can be costly. As an alternative, reactive power capability can be provided by adjusting active power production of the renewable energy farm at certain voltage levels (e.g. voltage levels outside of the ±5% of nominal voltage band). However, this can require knowledge of the actual reactive power limits of the renewable energy farm.

The reactive power limit of a renewable energy farm is typically determined by aggregating the reactive power limits of individual power generation units in the farm. The reactive power limit of an individual power generation unit is typically defined as rated reactive power for the unit and does not change based on system behavior. In situations wherein individual power generation units are clamped to voltage limits, the individual power generation units may not be able to provide rated reactive power, thus the rate reactive power is not a good estimate of the actual reactive power limit of the power generation unit.

Thus, a need exists for determining actual reactive power limits of a renewable energy farm under various system conditions. A system and method that can reduce active power production based on the actual reactive power capability in order to meet a power factor requirement would be particularly useful.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method for controlling a renewable energy system, such as a wind farm, solar farm, or other renewable energy system. The method includes controlling, by one or more control devices, a reactive power output for a renewable energy system based at least in part on an initial reactive power limit for the renewable energy system. The method further includes determining, by the one or more control devices, a difference between a reactive power demand and an actual reactive power production for the renewable energy system. When the difference falls outside a threshold, the method includes determining, by the one or more control devices, a correction factor for the initial reactive power limit and adjusting, by the one or more control devices, the initial reactive power limit to a corrected reactive power limit based at least in part on the correction factor. The method further includes controlling, by the one or more control devices, the reactive power output for the renewable energy system based at least in part on the corrected reactive power limit.

Another example aspect of the present disclosure is directed to a control system for controlling a renewable energy system. The control system includes a voltage regulator implemented by one or more control devices. The voltage regulator is configured to provide a reactive power command based at least in part on a voltage error signal. The control system can further include a limiter implemented by the one or more control devices. The limiter is configured to limit the reactive power command based at least in part on an initial reactive power limit for the renewable energy system. The control system further includes a reactive power limit correction module implemented by the one or more control devices. The reactive power limit correction module is configured to adjust the initial reactive power limit to a corrected reactive power limit when a difference between the reactive power command for the renewable energy system and an actual reactive power production for the renewable energy system falls outside of a threshold. The corrected reactive power limit corrects the initial reactive power limit towards the actual reactive power capability of the renewable energy system.

Yet another example aspect of the present disclosure is directed to a wind farm. The wind farm includes a plurality of wind turbines and a plurality of wind turbine controllers. Each wind turbine controller is associated with at least one of the plurality of wind turbines. The wind farm further includes a wind farm controller. The wind farm controller is in communication with each of the wind turbine controllers. The wind farm controller is configured to adjust an initial reactive power limit to a corrected reactive power limit based at least in part on a difference between a reactive power demand for the wind farm and an actual reactive power production for the wind farm. The wind farm controller is further configured to control the reactive power output of the wind farm based on the corrected reactive power limit. The initial reactive power limit is determined by aggregating a rated reactive power for each of a plurality of wind turbines in the wind farm and the corrected reactive power limit adjusts the initial reactive power limit toward the actual reactive power capability of the wind farm.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for determining reactive power capability for renewable energy systems to provide corrected reactive power limits in controlling reactive power output. A renewable energy system can include a farm or plant level control system for regulating voltage, reactive power, and/or power factor at the renewable energy system level. For instance, the farm level control system can include an inner loop voltage regulator with an outer loop reactive power/power factor regulator. The voltage regulator can compute reactive power commands based at least in part on the reactive power limits of the renewable energy system. The reactive power commands can then be distributed to individual power generation units (e.g. using a proportional distribution algorithm).

At the individual power generation units, a controller(s) can include an inner loop voltage regulator that can determine, for instance, commands for controlling the individual power generation unit. The input to the voltage regulator can include a reactive power regulator regulating the reactive power of the power generation unit based on the reactive power command distributed to the individual power generation unit. The reactive power regulator can provide a voltage reference to the inner loop voltage regulator. The reference can be clamped to the voltage limits of the power generation unit (e.g. ±10% of nominal voltage of the power generation unit).

The controller(s) associated with the individual power generation units can provide feedback data to the farm level control system. The feedback can include signals indicative of actual reactive power output by the individual power generation unit, minimum reactive power limit for the power generation unit, and maximum power limit for the power generation unit. These feedback signals can be aggregated to generate a farm or plant level aggregation signal for actual reactive power output, minimum reactive power limit, and maximum reactive power limit. The aggregated maximum reactive power limit and minimum reactive power limit can be used to clamp reactive power commands generated by the farm level control system.

According to example aspects of the present disclosure, a reactive power limit determined for the renewable energy system can be adjusted from an initial reactive power limit (e.g. determined based on rated reactive power) to reflect the actual reactive power capability of the renewable energy system based on current operating conditions. More particularly, in the event a difference between a reactive power demand and the actual reactive power production exceeds a threshold (e.g. greater than 5% of rated reactive power), the control system can adjust the reactive power limits towards the actual reactive power production of the renewable energy system. The renewable energy system can then be controlled in accordance with the corrected reactive power limits, for instance, by clamping the reactive power command closer to be closer to within the actual reactive power capability of the renewable energy system.

The corrected reactive power limits can be dynamically adjusted during operation based on the magnitude of the difference between the reactive power demand and the actual reactive power production. Once the difference between the reactive power command and the actual reactive power production returns to within a threshold and/or the voltage of the renewable energy system is able to follow a voltage reference generated from the reactive power regulator in the farm level control system, the reactive power limits can be adjusted back to their initial values.

Adjusting the reactive power limits according to example aspects of the present disclosure can allow for improved control of the renewable energy system to meet reactive power demands. For instance, a renewable energy system can be controlled based at least in part on the corrected reactive power limits to provide a rated reactive power capability in a voltage range of ±10% of nominal voltage at the point of interconnect. More particularly, the corrected reactive power limits can be used to reduce the active power production of the renewable energy system at certain voltage levels (e.g. voltage levels outside of the ±5% of nominal voltage band) to meet a power factor demand. In this way, rated reactive power can be provided under various grid conditions without requiring, for instance, an on-load tap changing transformer.

Referring now to the drawings, example embodiments of the present disclosure will be discussed in detail. Aspects of the present disclosure will be discussed with reference to wind renewable energy systems for purposes of illustration and discussion. Those of ordinary skill in the art, using the disclosures provided herein, will understand that example aspects of the present disclosure can be implemented in other power generation systems, such as solar farms, energy storage systems, etc.

Figure 1:
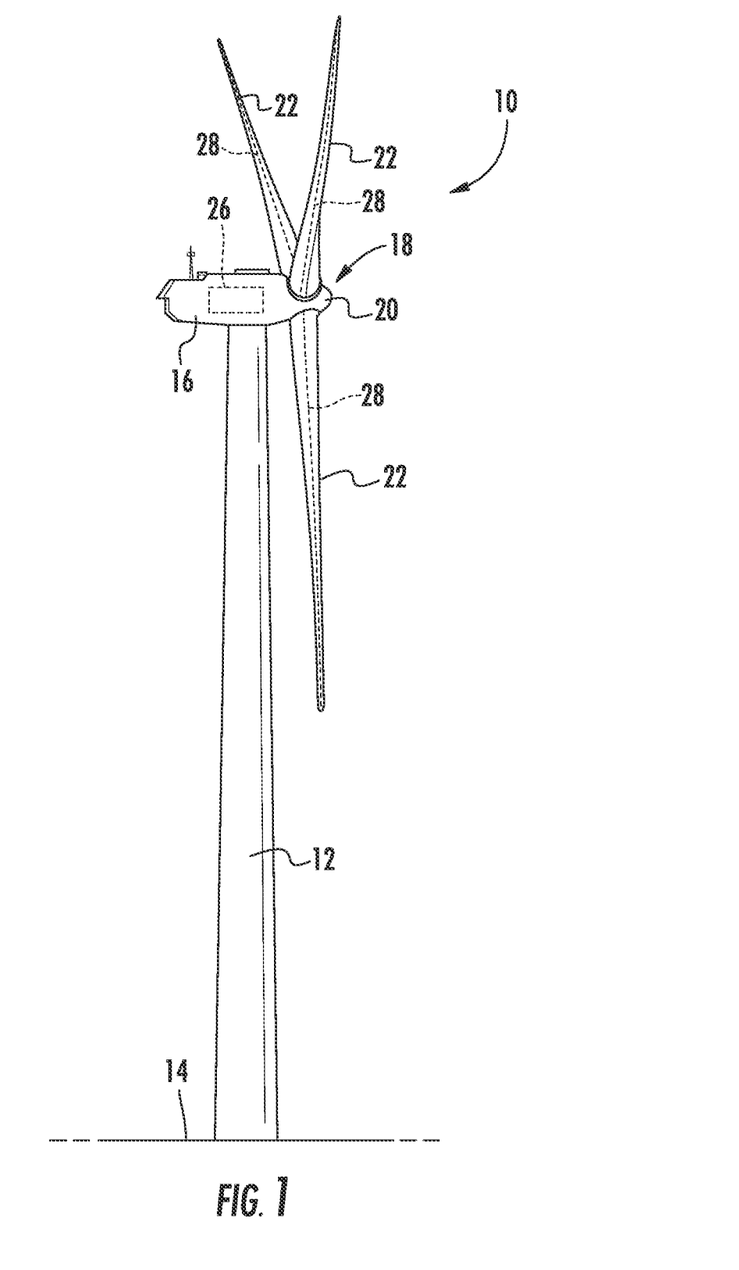
FIG. 1 depicts an example wind turbine that can be controlled according to example aspects of the present disclosure.

FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
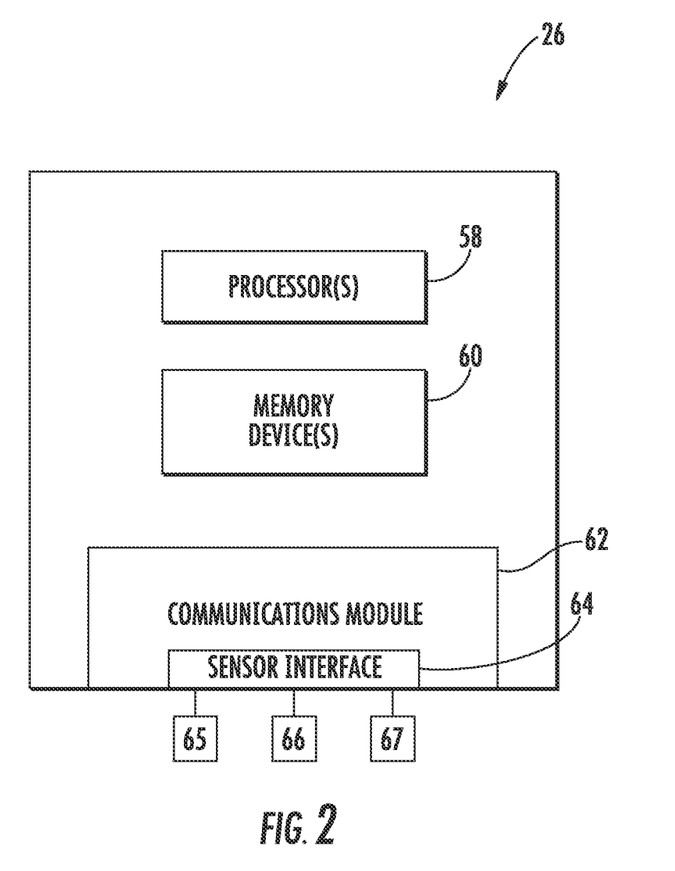
FIG. 2 depicts an example controller according to example aspects of the present disclosure.

Referring now to FIG. 2, a block diagram of one embodiment of suitable components that may be included within the controller 26 is illustrated in accordance with aspects of the present disclosure. As shown, the controller 26 may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, application-specific processors, digital signal processors (DSPs), Application Specific Integrated Circuits (ASICs), Field Programmable Gate Arrays (FPGAs), and/or any other programmable circuits. Further, the memory device(s) 60 may generally include memory element(s) including, but are not limited to, computer readable medium (e.g., random access memory (RAM)), computer readable non-volatile medium (e.g., a flash memory), one or more hard disk drives, a floppy disk, a compact disc-read only memory (CD-ROM), compact disk-read/write (CD-R/W) drives, a magneto-optical disk (MOD), a digital versatile disc (DVD), flash drives, optical drives, solid-state storage devices, and/or other suitable memory elements.

Additionally, the controller 26 may also include a communications module 62 to facilitate communications between the controller 26 and the various components of the wind turbine 10. For instance, the communications module 62 may include a sensor interface 64 (e.g., one or more analog-to-digital converters) to permit the signals transmitted by one or more sensors 65, 66, 67 to be converted into signals that can be understood and processed by the controller 26. Furthermore, it should be appreciated that the sensors 65, 66, 67 may be communicatively coupled to the communications module 62 using any suitable means. For example, as shown in FIG. 2, the sensors 65, 66, 67 are coupled to the sensor interface 64 via a wired connection. However, in alternative embodiments, the sensors 65, 66, 67 may be coupled to the sensor interface 64 via a wireless connection, such as by using any suitable wireless communications protocol known in the art. For example, the communications module 62 may include the Internet, a local area network (LAN), wireless local area networks (WLAN), wide area networks (WAN) such as Worldwide Interoperability for Microwave Access (WiMax) networks, satellite networks, cellular networks, sensor networks, ad hoc networks, and/or short-range networks. As such, the processor 58 may be configured to receive one or more signals from the sensors 65, 66, 67.

The sensors 65, 66, 67 may be any suitable sensors configured to measure any operating data points of the wind turbine 10 and/or wind parameters of the wind farm. It should also be understood that any other number or type of sensors may be employed and at any location. For example, the sensors may be accelerometers, pressure sensors, strain gauges, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors. It should be appreciated that, as used herein, the term "monitor" and variations thereof indicates that the various sensors of the wind turbine 10 may be configured to provide a direct measurement of the parameters being monitored or an indirect measurement of such parameters. Thus, the sensors 65, 66, 67 may, for example, be used to generate signals relating to the parameter being monitored, which can then be utilized by the controller 26 to determine the actual condition.

Figure 3:
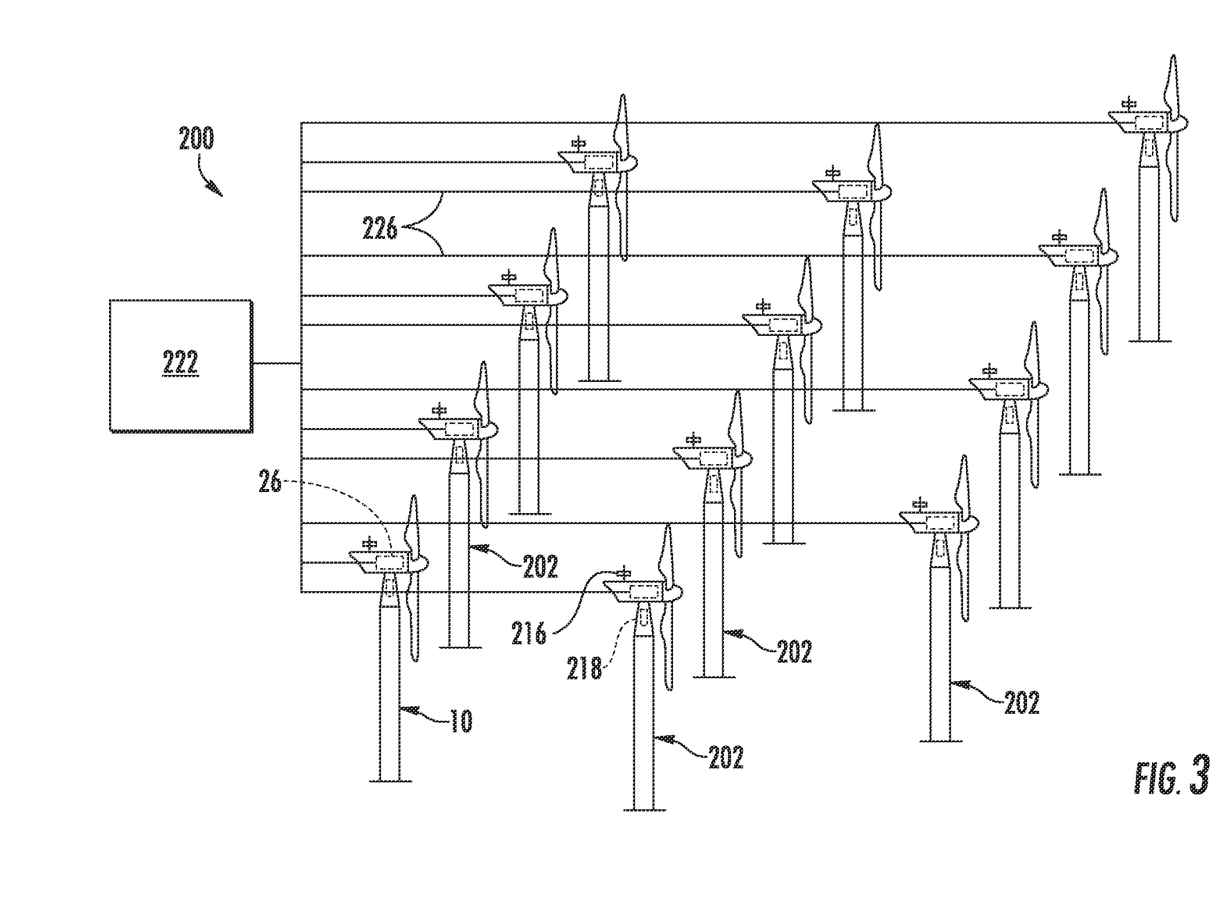
FIG. 3 depicts an example wind farm according to example aspects of the present disclosure.

Referring now to FIG. 3, a wind farm 200 that is controlled according to example aspects of the present disclosure is illustrated. As shown, the wind farm 200 may include a plurality of wind turbines 202, including the wind turbine 10 described above, and a farm controller 222. For example, as shown in the illustrated embodiment, the wind farm 200 includes twelve wind turbines, including wind turbine 10. However, in other embodiments, the wind farm 200 may include any other number of wind turbines, such as less than twelve wind turbines or greater than twelve wind turbines. In one embodiment, the controller 26 of the wind turbine 10 may be communicatively coupled to the farm controller 222 through a wired connection, such as by connecting the controller 26 through suitable communicative links 226 (e.g., a suitable cable). Alternatively, the controller 26 may be communicatively coupled to the farm controller 222 through a wireless connection, such as by using any suitable wireless communications protocol known in the art. In addition, the farm controller 222 may be generally configured similar to the controllers 26 for each of the individual wind turbines 202 within the wind farm 200.

Figure 4:
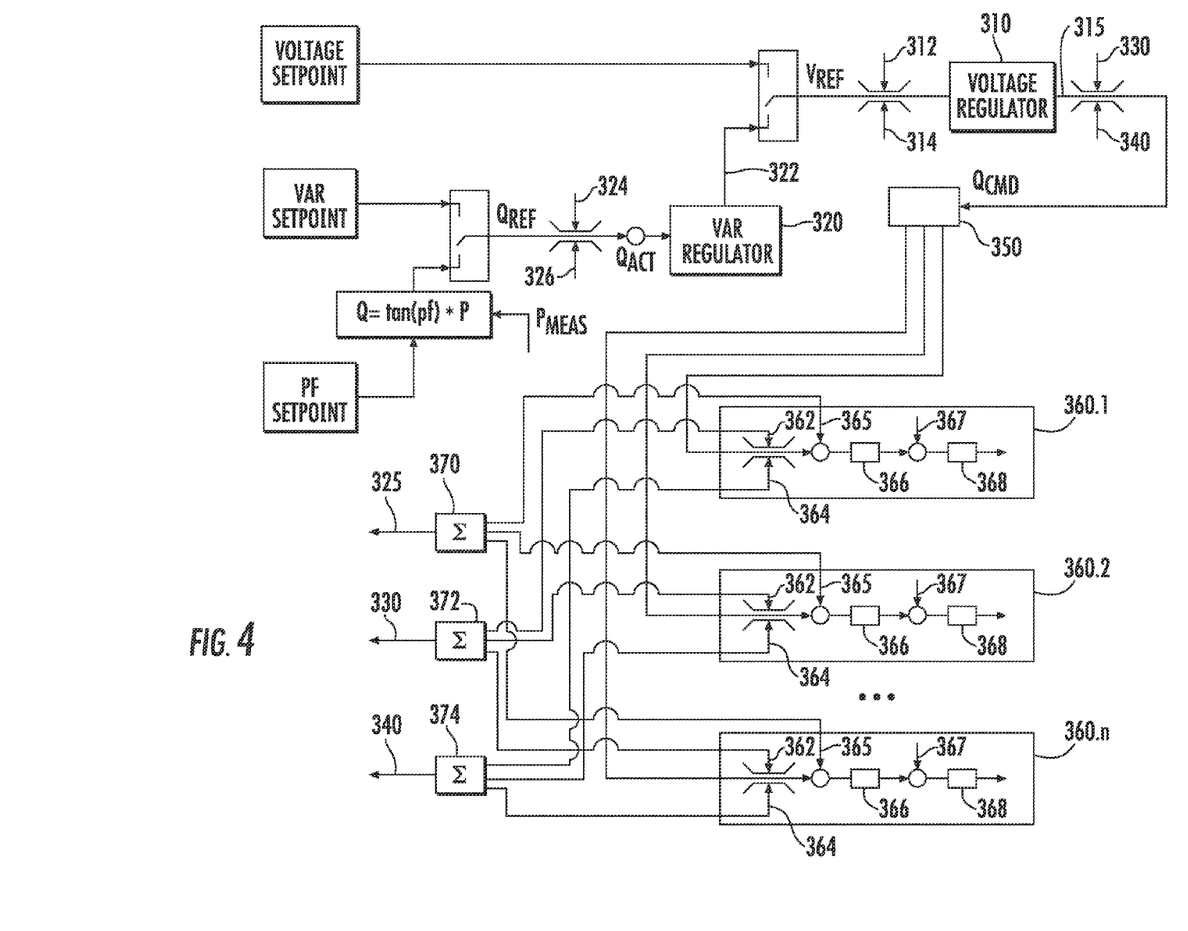
FIG. 4 depict an example control topology for a wind farm according to example aspects of the present disclosure.

FIG. 4 depicts an example control topology for controlling a wind farm according to example embodiments of the present disclosure. The control topology can be implemented using one or more control devices, such the farm controller 222 and various individual controllers 26 associated with the individual wind turbines in the farm 200 shown in FIG. 3.

As shown in FIG. 4, the one or more control devices can implement an inner loop voltage regulator 310 for the wind farm and an outer loop power factor/reactive power regulator 320 for the wind farm. The voltage regulator 310 can receive a $V_{REF}$ command determined from a voltage setpoint and/or an output 322 of the reactive power regulator 320.

The reactive power regulator 320 can generate an output 322 based on an error between a clamped $Q_{REF}$ command and a $Q_{ACT}$ signal indicative of the actual reactive power output of the wind farm. The $Q_{REF}$ command can be clamped based on an upper reactive power limit 324 for the wind farm and a lower reactive power limit for the wind farm 326. The $Q_{REF}$ command can be determined from a reactive power (VAR) setpoint and/or a power factor setpoint. For instance, the $Q_{REF}$ command can be determined as tan (pf)*P where pf is the power factor setpoint and P is the measured power output $P_{meas}$ of the wind farm.

The voltage regulator 310 can receive $V_{REF}$ after it has been clamped by a voltage maximum 312 for the wind farm and a voltage minimum 324 for the wind farm. The voltage regulator 310 generates a reactive power command 315 based on the clamped $V_{REF}$ signal. The reactive power command 315 can be clamped by a limiter based on a maximum reactive power limit 330 and a minimum reactive power limit 340 to generate a clamped reactive power command $Q_{CMD}$. As will be discussed in more detail below, the maximum reactive power limit 330 and the minimum reactive power limit 340 can be adjusted from an initial value (e.g. determined based on rated reactive power) to a corrected value that more accurately reflects the wind farm reactive power capability in various operating circumstances.

The clamped reactive power command $Q_{REF}$ can be distributed to controller(s) associated with individual wind turbines according to a proportional distribution algorithm 350. For instance, the clamped reactive power command $Q_{REF}$ can be distributed to controller(s) 360.1, 360.2 . . . 360.n associated with the individual wind turbine controllers. As shown, the reactive power command for each wind turbine can be clamped based on a maximum reactive power limit 362 for the wind turbine and a minimum reactive power limit 364 for the wind turbine. The maximum reactive power limit 362 and minimum reactive power limit 364 can be determined based on the rated reactive power for the wind turbine. The clamped reactive power command for the wind turbine can be compared to a signal indicative of actual reactive power production 365 for the wind turbine to generate an error signal. The error signal can be provided to a reactive power regulator which can generate a voltage command based on the error signal. The voltage command can be compared to a signal 367 indicative of actual voltage at the wind turbine to generate an error signal for a regulator 368 that generates an imaginary current command for the turbine.

As shown in FIG. 4, the controller(s) 360.1, 360.2, . . . 360.n can provide various feedback signals for use by the control system. For instance, a signal indicative of maximum reactive power limit 362, minimum reactive power limit 364, and actual reactive power production 365, for each of the wind turbines can be provided by the controller(s) 360.1, 360.2, . . . 360.n. The signals 365 indicative of actual reactive power production can be aggregated at 370 to generate a signal 325 indicative of actual power production for the wind farm. The signals 362 indicative of maximum reactive power limit for each wind turbine can be aggregated at 372 to generate signal 330 indicative of the maximum reactive power limit for the wind farm. The signals 364 indicative of the minimum reactive power limit for each wind turbine can be aggregated at 374 to generate signal 340 indicative of the minimum reactive power limit for the wind farm.

As shown, the signals 330 and 340 are used to clamp the reactive power command 315 output by the voltage regulator 310 to generate a clamped reactive power command $Q_{CMD}$. According to example aspects of the present disclosure, the signals 330 and 340 can be adjusted from initial values to corrected values during certain operating conditions. For instance, if a difference between the reactive power command and the actual reactive power production of the farm falls outside of a threshold (e.g. greater or less than 5% of rated reactive power relative to the reactive power demand), the maximum reactive power limit 330 and the minimum reactive power limit 340 can be adjusted towards the actual reactive power production of the farm until the difference returns to within the threshold.

Figure 5:
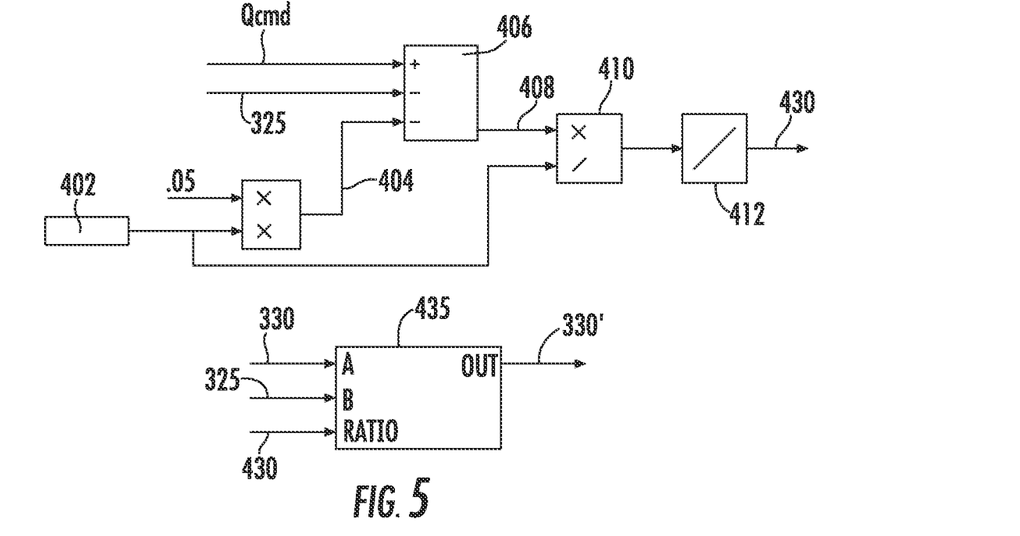
FIG. 5 depicts an example control topology for determining a corrected maximum reactive power limit according to example aspects of the present disclosure.

FIG. 5 depicts a control scheme for an example reactive power limit correction module implemented by one or more control devices for adjusting the maximum reactive power limit 330 according to example embodiments of the present disclosure. As shown, a threshold signal 404 can be generated based on a percentage of rated reactive power 402 for the wind farm. In the example of FIG. 5, the threshold signal 404 is representative of 5% of rated reactive power 402. Other suitable percentages of rated reactive power can be used without deviating from the scope of the present disclosure. At 406, a difference between the reactive power command $Q_{CMD}$, the actual reactive power production 325, and the threshold signal 402 can be determined to generate difference signal 408.

A ratio of the difference signal 408 to the rated reactive power 402 can be determined at 410 and can be provided to correction factor module 412. The correction factor module 412 can determine a correction factor 430 for the maximum reactive power limit 330 based on the ratio of the difference signal 408 to the rated reactive power 402. For instance, in particular embodiments, the greater the difference signal 408 relative to rated reactive power 402, the greater the correction factor 430.

The correction factor 430 can be used to adjust the maximum reactive power limit 330 towards the actual reactive power capability of the wind farm. For instance, the maximum reactive power limit 330, the correction factor 430 and the actual reactive power production 325 can be provided to an estimator module 335. The estimator module 335 can adjust the maximum reactive power limit 330 towards the actual reactive power production 325 based on the correction factor 430 to generate an adjusted reactive power limit 330'. For example, as the correction factor 430 increases, the adjusted maximum reactive power limit 330' can be adjusted closer to the actual reactive power production 325. As the correction factor 430 decreases, the adjusted maximum reactive power limit 330' can be adjusted closer to the initial maximum reactive power limit 330.

Figure 6:
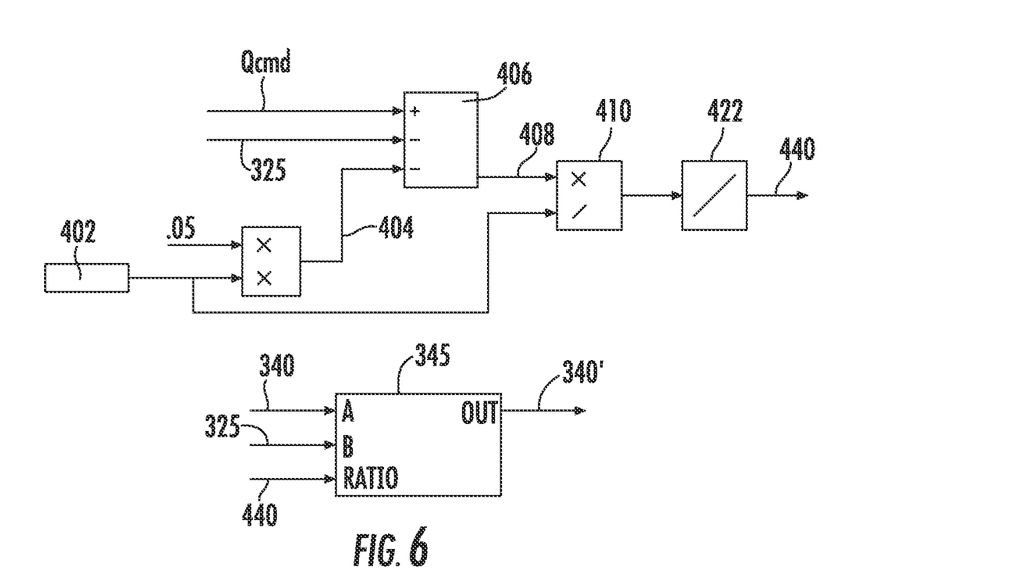
FIG. 6 depicts an example control topology for determining a corrected minimum reactive power limit according to example aspects of the present disclosure.

FIG. 6 depicts a control scheme for an example reactive power limit correction module implemented by one or more control devices for adjusting the minimum reactive power limit 330 according to example embodiments of the present disclosure. As shown, a threshold signal 402 can be generated based on a percentage of rated reactive power 402 for the wind farm. In the example of FIG. 6, the threshold signal 402 is representative of 5% of rated reactive power 402. At 406, a difference between the reactive power command $Q_{CMD}$, the actual reactive power production 325, and the threshold signal 402 can be determined to generate difference signal 408.

A ratio of the difference signal 408 to the rated reactive power 402 can be determined at 410 and can be provided to correction factor module 422. The correction factor module 422 can determine a correction factor 430 for the minimum reactive power limit 340 based on the ratio of the difference signal 408 to the rated reactive power 402. For instance, in particular embodiments, the greater the difference signal 408 relative to rated reactive power 402, the greater the correction factor 440.

The correction factor 440 can be used to adjust the minimum reactive power limit 340 towards the actual reactive power capability of the wind farm. For instance, the minimum reactive power limit 340, the correction factor 440 and the actual reactive power production 325 can be provided to an estimator module 345. The estimator module 345 can adjust the minimum reactive power limit 340 towards the actual reactive power production 325 based on the correction factor 440 to generate an adjusted reactive power limit 340'. For example, as the correction factor 440 increases, the adjusted maximum reactive power limit 340' can be adjusted closer to the actual reactive power production 325. As the correction factor 440 decreases, the adjusted maximum reactive power limit 340' can be adjusted closer to the initial maximum reactive power limit 330.

Referring back to FIG. 4, the adjusted maximum reactive power limit 330' and the adjusted minimum reactive power limit 340' can be used by a limiter to clamp the output 315 of the voltage regulator 310 to generate a new reactive power command $Q_{CMD}$ that more closely follows the actual reactive power capability of the wind farm.

Figure 7:
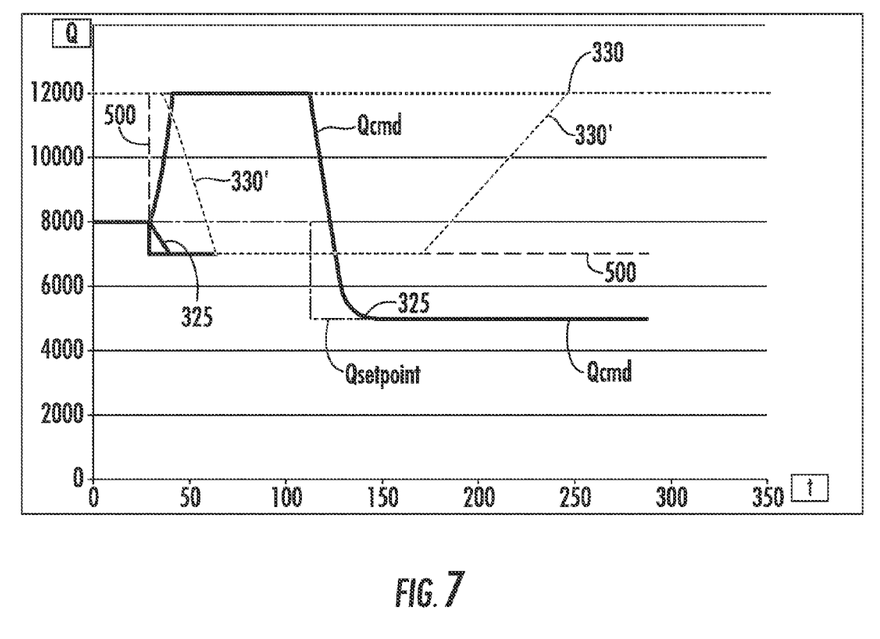
FIG. 7 depicts a graphical representation of example behavior of a control system according to example aspects of the present disclosure.

FIG. 7 depicts a graphical representation of the example behavior of a control system based on reduction of actual reactive power capability due to a voltage clamp at the individual wind turbines. FIG. 7 plots time along the horizontal axis and magnitude of reactive power along the vertical axis. Signal 500 represents the reduction of actual reactive power capability over time for a wind farm due to a voltage clamp at the individual wind turbines. More particularly, at time t30 the actual reactive power capability reduces to about 7000 kvar. The reactive power setpoint for the farm $Q_{SETPOINT}$ remains at 8000 kvar. As shown, $Q_{CMD}$ starts increasing to attempt to achieve the reactive power production specified by $Q_{SETPOINT}$. According to example aspects of the present disclosure, the control system generates a correction factor to reduce signal 330 indicative of maximum reactive power limit to an adjusted maximum reactive power limit 330' representative of the actual reactive power capability of the system. As shown, signal 330' more closely follows signal 500 indicative of the actual reactive power capability of the system.

At time t114, the setpoint $Q_{SETPOINT}$ is reduced to 5000 kvar, while the real reactive power capability 500 is above the setpoint at 7000 kvar. As shown, the regulator reduces $Q_{CMD}$ to follow the setpoint. This causes the difference between the reactive power command $Q_{CMD}$ and the actual reactive power capability 500 to be reduced. As a result, the correction factor for adjusting the maximum reactive power limit is reduced such that the adjusted reactive power limit 330' moves back towards the initial maximum reactive power limit 300.

Figure 8:
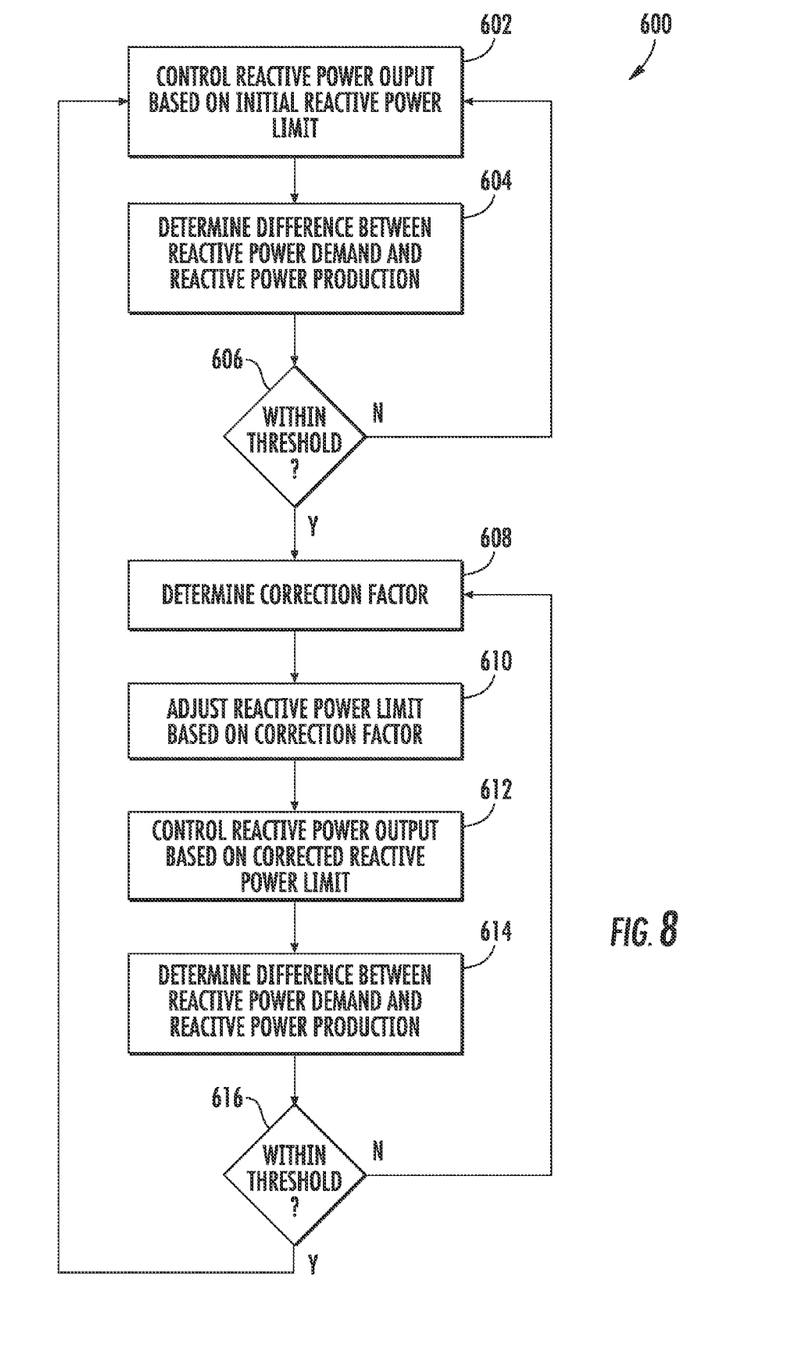
FIG. 8 depicts a flow diagram of an example method for controlling a wind farm according to example aspects of the present disclosure.

FIG. 8 depicts a flow diagram of an example method (600) for controlling a renewable energy system according to example aspects of the present disclosure. The method (600) can be implemented by one or more control devices, such as any of example the control devices set forth in the present disclosure. In addition, FIG. 8 depicts steps performed in a particular order for purposes of illustration and discussion. Those of ordinary skill in the art, using the disclosures provided herein, will understand that various steps of any of the methods disclosed herein can be modified, adapted, expanded, omitted, and/or rearranged in various ways without deviating from the scope of the present disclosure.

At (602), the method includes controlling a reactive power output based on an initial reactive power limit. For instance, as shown in FIG. 4, a reactive power command output by a voltage regulator 310 can be limited based at least in part on an initial maximum reactive power limit 330 and/or an initial minimum reactive power limit 340 to generate reactive power command $Q_{CMD}$. The initial reactive power limit can be determined, for instance, based at least in part on the rated reactive power of the individual power generation units. For instance, the initial reactive power limit can be determined by aggregating a rated reactive power for each of a plurality of power generation units in the renewable energy system At (604), the method includes determining a difference between a reactive power demand (e.g. as represented by a reactive power command) and an actual reactive power production for the renewable energy system. For instance, a difference between the $Q_{CMD}$ and the signal 325 indicative of actual reactive power production can be determined.

At (606), the difference can be compared to a threshold. The threshold can be, for instance, 5% of rated reactive power for the renewable energy system. When the difference is within threshold, the method continues to control the reactive power output of the renewable energy system based on the initial reactive power limit. When the difference is outside of the threshold, the method determines a correction factor for the initial reactive power limit (608). The correction factor can be used to adjust the initial reactive power limit toward the actual reactive power production of the renewable energy system. In embodiments, the correction factor can be determined based on the magnitude of the difference between the reactive power demand and the actual reactive power production of the renewable energy system.

At (610), the reactive power limits are adjusted based on the correction factor. For instance, the reactive power limits can be adjusted to a corrected reactive power limit. The corrected reactive power limit can be closer to the actual reactive power capability of the renewable energy system. The correction factor can be used to generate a corrected maximum reactive power limit and/or a corrected minimum reactive power limit At (612), the method includes controlling the reactive power output based at least in part on the corrected reactive power limit. For instance, a reactive power command output by a voltage regulator 310 can be limited based at least in part on the corrected maximum reactive power limit 330' and/or the corrected minimum reactive power limit 340' to generate reactive power command $Q_{CMD}$.

At (614), the difference between the reactive power demand (as determined based on the corrected reactive power limits) and the actual reactive power production can be determined. At (616), it can be determined whether the difference is within a threshold (e.g. 5% of rated reactive power for the renewable energy system). If the difference is not within the threshold, the method can continue to adjust the initial reactive power limits based on a correction factor as illustrated in FIG. 8. If the difference has returned to within the threshold, the method can control the reactive power output based on the initial reactive power limit (602).

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a renewable energy system, comprising:
    controlling, by one or more control devices, a reactive power output for a renewable energy system based at least in part on an initial reactive power limit for the renewable energy system;
    determining, by the one or more control devices, a difference between a reactive power demand and an actual reactive power production for the renewable energy system;
    wherein when the difference falls outside a threshold, the method comprises:
        determining, by the one or more control devices, a correction factor for the initial reactive power limit;
        adjusting, by the one or more control devices, the initial reactive power limit to a corrected reactive power limit based at least in part on the correction factor; and
        controlling, by the one or more control devices, the reactive power output for the renewable energy system based at least in part on the corrected reactive power limit;
    detecting, by the one or more control devices, the difference returning to within the threshold; and
    in response to detecting the difference returning to within the threshold, controlling, by the one or more control devices, the reactive power output based at least in part on the initial reactive power limit.

2. The method of claim 1, wherein the initial reactive power limit is determined by aggregating a rated reactive power for each of a plurality of power generation units in the renewable energy system.

3. The method of claim 1, wherein the correction factor results in adjusting the initial reactive power limit towards the actual reactive power capability of the renewable energy system.

4. The method of claim 1, wherein the initial reactive power limit comprises an initial maximum reactive power limit and an initial minimum reactive power limit.

5. The method of claim 4, wherein the corrected reactive power limit comprises a corrected maximum reactive power limit and a corrected minimum reactive power limit.

6. The method of claim 1, wherein the threshold comprises 5% of rated reactive power for the renewable energy system.

7. The method of claim 1, wherein the corrected reactive power limit is used to limit a reactive power command for the renewable energy system.

8. The method of claim 7, wherein the reactive power command is distributed to a plurality of power generation units.

9. A control system for controlling a renewable energy system, the control system comprising:
    a voltage regulator implemented by one or more control devices, the voltage regulator configured to provide a reactive power command based at least in part on a voltage error signal;
    a limiter implemented by the one or more control devices, the limiter configured to limit the reactive power command based at least in part on an initial reactive power limit for the renewable energy system;
    a reactive power limit correction module implemented by the one or more control devices, the reactive power limit correction module configured to adjust the initial reactive power limit to a corrected reactive power limit when a difference between the reactive power command for the renewable energy system and an actual reactive power production for the renewable energy system falls outside of a threshold, and wherein the reactive power limit correction module is configured to detect the difference returning to within the threshold, and in response to detecting the difference returning to within the threshold, control the reactive power output based at least in part on the initial reactive power limit;
    wherein the corrected reactive power limit corrects the initial reactive power limit towards the actual reactive power capability of the renewable energy system.

10. The control system of claim 9, the initial reactive power limit is determined by aggregating a rated reactive power for each of a plurality of power generation units in the renewable energy system.

11. The control system of claim 9, wherein the threshold comprises 5% of rated reactive power for the renewable energy system.

12. The control system of claim 9, wherein the corrected reactive power limit is determined based at least in part on a correction factor, the correction factor determined based on the difference between the reactive power demand for the renewable energy system and the actual reactive power production for the renewable energy system.

13. The control system of claim 9, wherein the reactive power command is determined based at least in part on a power factor setpoint for the renewable energy system.

14. A wind farm, comprising:
    a plurality of wind turbines;
    a plurality of wind turbine controllers, each wind turbine controller associated with at least one of the plurality of wind turbines; and
    a wind farm controller, the wind farm controller in communication with each of the wind turbine controllers, the wind farm controller configured to adjust an initial reactive power limit to a corrected reactive power limit based at least in part on a difference between a reactive power demand for the wind farm and an actual reactive power production for the wind farm, the wind farm controller further configured to control the reactive power output for the wind farm based on the corrected reactive power limit, and wherein the wind farm controller is configured to detect the difference returning to within a threshold, and in response to detecting the difference returning to within the threshold, control the reactive power output based at least in part on the initial reactive power limit;
    wherein the initial reactive power limit is determined by aggregating a rated reactive power for each of a plurality of wind turbines in the wind farm and the corrected reactive power limit adjusts the initial reactive power limit toward an actual reactive power capability of the wind farm.

15. The wind farm of claim 14, wherein the wind farm controller is configured to adjust an initial reactive power limit to a corrected reactive power limit based at least in part on a difference between a reactive power demand for the wind farm and an actual reactive power production for the wind farm by determining that the difference falls outside the threshold and adjusting the initial reactive power limit to the corrected reactive power limit when the difference falls outside the threshold.

16. The wind farm of claim 15, wherein the initial reactive power limit is adjusted to the corrected reactive power limit based at least in part on a correction factor, the correction factor determined based on the difference between the reactive power demand and the actual reactive power production.

17. The wind farm of claim 15, wherein the threshold is 5% of rated reactive power for the wind farm.

18. The wind farm of claim 14, wherein the wind farm controller is configured to distribute the reactive power command among the plurality of wind turbine controllers.

19. The wind farm of claim 14, wherein the wind farm controller is configured to control the reactive power output of the wind farm based at least in part on a power factor setpoint.

* * * * *